INVENTOR
GUY S. YOE, JR.

April 29, 1969   G. S. YOE, JR   3,440,977
REFUSE BURNER

Filed Feb. 14, 1967   Sheet 2 of 2

INVENTOR
GUY S. YOE, JR.
BY
James D. Hackbert
ATTORNEY

United States Patent Office 3,440,977
Patented Apr. 29, 1969

3,440,977
REFUSE BURNER
Guy S. Yoe, Jr., Evansville, Ind., assignor to George Koch Sons, Inc., Evansville, Ind., a corporation of Indiana
Filed Feb. 14, 1967, Ser. No. 616,122
Int. Cl. F23b 1/30; F23g 7/00
U.S. Cl. 110—18      3 Claims

ABSTRACT OF THE DISCLOSURE

A commercial refuse burner characterized by a secondary combustion zone for the control or abatement of air pollution and including a source of air to create turbulence and a dampening effect, a burner arrangement, and a filter of atomized water.

---

The commercial incineration of refuse is an important aspect of both community and industrial development. A highly effective approach to such incineration, a refuse burner of the conical type, is described and claimed in United States Patent No. 3,137,253, entitled Refuse Burner Construction and Method of Building Same, granted June 16, 1964, in the name of Alfred W. Clayton. An important consideration involved in the design and construction of commercial incinerators is the elimination or minimization of air pollution, as aspect which is becoming of more concern because of the increase of both community and industrial refuse.

The invention provides an important improvement to the known conical form of refuse burner in establishing a secondary combustion zone in the form of a dampening device to slow stack gas velocity, as well as to provide air turbulence, for mixing combustion air and stack gases to promote secondary burning, with the over-all control or reduction of air pollution also being assisted through a filter screen of atomized water. In other words, the invention importantly serves to remove increments, in the form of smoke particles and ash, resulting from incinerating action, for the desired objective of eliminating or minimizing air pollution.

In accomplishing the preceding, the invention forms part of the known conical type of refuse burner, typically being positioned proximate the top thereof and beneath the spark arrestor, structure described in the aforesaid issued United States Patent. The invention basically comprises a source of air, where the latter is introduced within the refuse burner to create air turbulence and a dampening effect, and, as well, introduced to spaced-apart fuel operated burners as a source of combustion air. The provision of a screen of atomized water, disposed beneath the spark arrestor, further serves to filter or precipitate any solids resulting from combustion. Highly effective end results are achieved through the invention, representing a considerable improvement over the previously known conical forms of refuse burner in minimizing air pollution.

Figure 1:
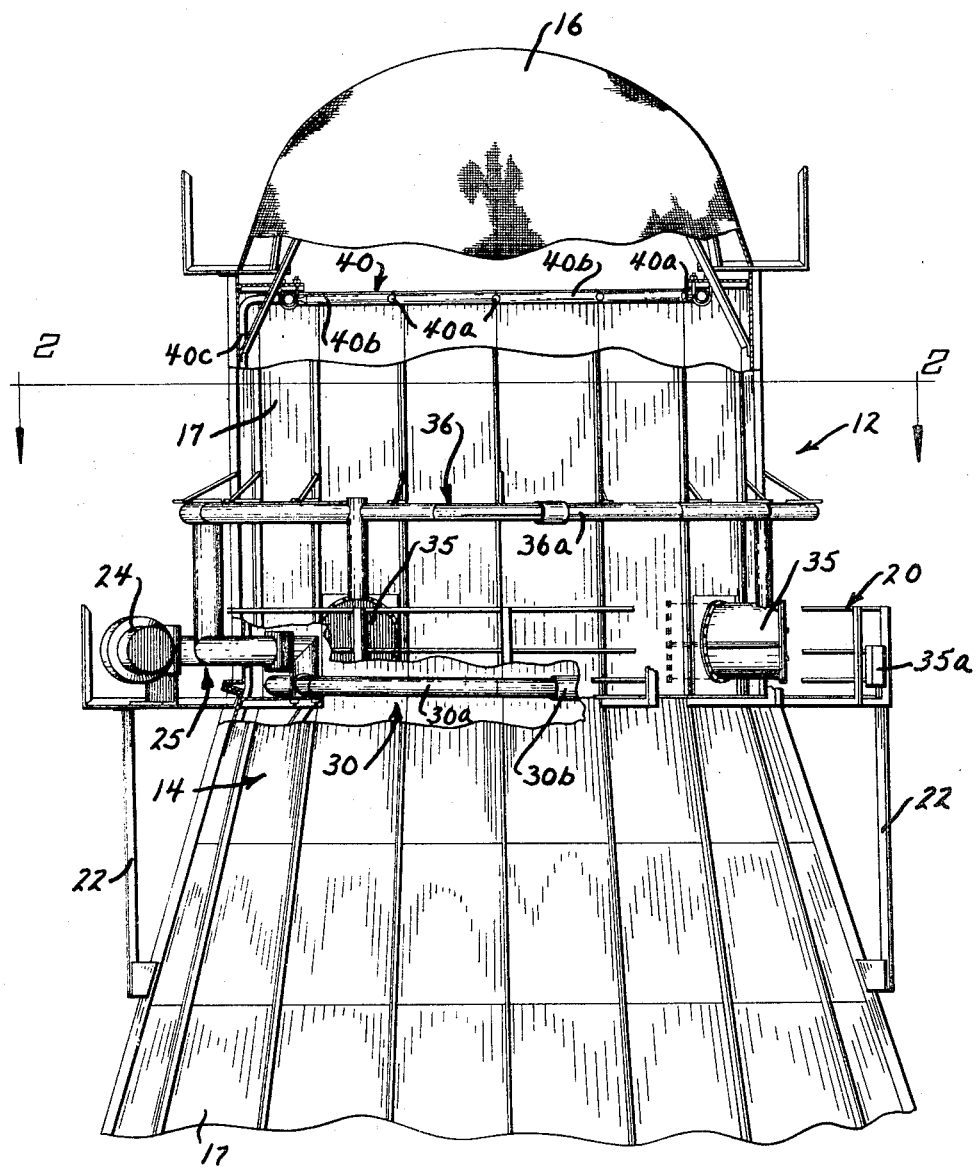
Figures 2, 3:
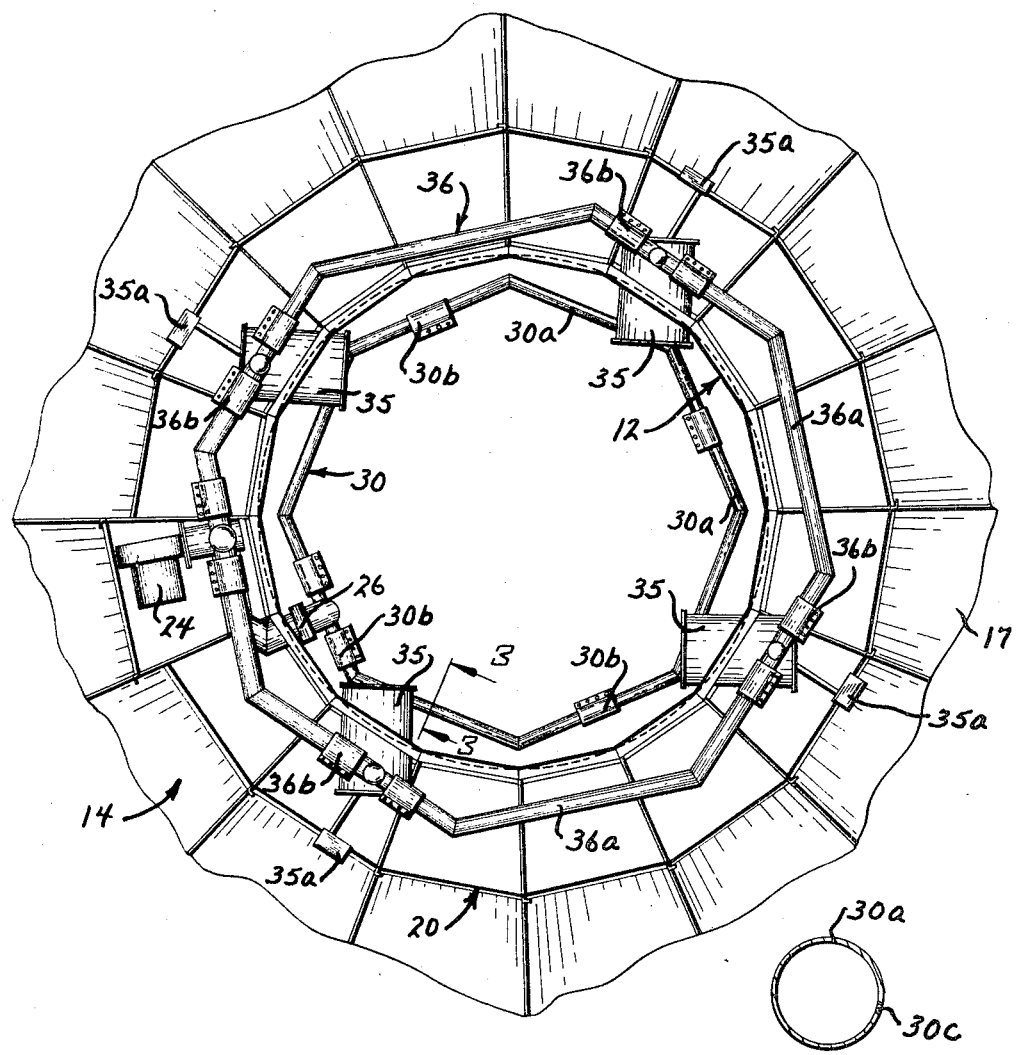

A better understanding of the present invention will become more apparent from the following description, taken in conjunction with the accompanying drawings, wherein FIG. 1 is a view in side elevation, partly fragmentary, showing the refuse burner forming the invention;

FIG. 2 is a view in horizontal section, also partly fragmentary, taken at line 2—2 of FIG. 1 and looking in the direction of the arrows, showing further details of the invention; and FIG. 3 is an enlarged view in vertical section showing certain details of the air feeding arrangement utilized in the invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The invention is shown in the drawings in combination with a portion of the base of a known conical form of refuse burner, as described and claimed in the aforesaid United States Patent No. 3,137,253. Referring to the figures, however, an intermediate or secondary combustion zone 12, typically in the form of a right circular cylinder, is disposed between the top of the truncated cone 14 of the patented structure and the screened dome 16 thereof. It should be understood that the indicated skin 17 and liner (not identified by a reference numeral) relationship is carried out to define the secondary combustion zone of the invention.

A cat-walk 20 is positioned through frame members 22 around the periphery of a portion of the secondary combustion zone. An air blower 24 is mounted within the space defined by the cat-walk 20 and a conduit arrangement 25 is provided leading to (a) an air distribution system 30 contained within the refuse burner and (b) a supply arrangement 36 for combustion air communicating with several spaced-apart burner units 35, the latter each being operated through a conventional control box 35a.

More specifically, the conduit arrangement 25 from the air blower 24 includes a known butterfly valve 26, for air control function, and a series of conduit sections 30a, maintained in assembled relationship by clamps 30b (see FIG. 2). In a preferred form of invention, and as apparent in FIG. 3, air outlets 30c in the conduit sections 30a are directed downwardly with reference to a horizontal plane, to assist in the creation of dampening and air turbulence in the stack defined by the refuse burner.

The remaining conduit arrangement 36 leads from the air blower 24 through sections of conduit 36a, also assembled through clamps 36b, to each of the burner units 35, serving as a source of combustion air. In other words, with the invention, a new and additional combustion zone is provided, serving, as stated, to remove increments, in the form of smoke particles and ash, resulting from the primary combustion zone, for the abatement or control of air pollution.

In order to filter or precipitate any remaining combustion increments, and as should be apparent from FIG. 1, a water line 40 is provided, including a series of jet nozzles 40a to permit atomization. The water line 40 may be defined as a series of pipe sections 40b disposed within the refuse burner and spraying a screen of atomized water in any desired configuration. As should be apparent from FIG. 1, the water line 40 is mounted beneath the screened dome 16, where the water flows from a source (not shown) through a supply line 40c mounted between the skin 17 and liner of the over-all unit.

In use, refuse is deposited at the base of the burner structure, and ignited and caused to burn in the usual manner. The secondary combustion zone is activated through the air blower 24 which, through system 30, provides turbulence for the gas, including carried increments, from the primary combustion zone, and serves, as well, as a dampener. Thereafter, the ignition of the aforesaid increments is caused by the burner units 35, combustion air being provided through arrangement 36. Additionally, the atomized water screen, from the jet nozzles 40a and typically in a horizontal plane, serves to precipitate any remaining heavy combustion by-product increments, and where, as a further pollution and/or danger precaution, the screened dome 16 acts as a spark arrestor.

As discussed, the invention quite importantly contributes to commercial incineration and the now increasing problem of air pollution. In this regard, effective minimization and control of air pollution is a value result of the invention, through the structure and arrangement described hereabove.

The refuse burner is susceptible to various changes within the spirit of the invention. For example, over-all proportioning and configuration may be varied, the number and pattern of burning units employed changed, the configuration and form of the air supply and the water atomization modified, and additional structure included to meet any custom installation. Thus, the above description should be considered illustrative, and not as limiting the scope of the following claims.

I claim:

1. A refuse burner defined by a base portion in the shape of a truncated cone, a screened dome and a cylindrical portion between the top of said truncated cone and said screened dome, a first combustion zone within said truncated cone, a second combustion zone disposed above said first combustion zone and within said cylindrical portion, and burners disposed about the periphery of said second combustion zone, said second combustion zone having a first air supply to create turbulence and dampening and a second air supply for said burners, and said burners disposed above said first air supply and cooperable with the air thereof.

2. The refuse burner of claim 1 wherein a water screen is disposed within said refuse burner in the region proximate the junction of said cylindrical portion and said screened dome thereof.

3. The refuse burner of claim 1 where said first air supply is defined by a series of communicating conduits, and where air outlets are provided along said communicating conduits opening downwardly with respect to a horizontal plane.

References Cited

UNITED STATES PATENTS

| | | |
|---|---|---|
| 2,869,487 | 1/1959 | Sherman. |
| 3,215,501 | 11/1965 | Phillips. |
| 3,248,178 | 4/1966 | Hoskinson. |
| 3,330,231 | 7/1967 | Spencer _____ 110—18 |

OTHER REFERENCES

German printed application 1,146,661 (1963).

JAMES W. WESTHAVER, *Primary Examiner.*

U.S. Cl. X.R.

110—7